United States Patent [19]

Olson

[11] Patent Number: 4,472,480
[45] Date of Patent: Sep. 18, 1984

[54] LOW SURFACE ENERGY LINER OF PERFLUOROPOLYETHER

[75] Inventor: Paul E. Olson, Stillwater, Minn.

[73] Assignee: Minnesota Mining and Manufacturing Company, St. Paul, Minn.

[21] Appl. No.: 394,532

[22] Filed: Jul. 2, 1982

[51] Int. Cl.³ .............. C09J 7/02; B05D 3/02; B32B 27/00
[52] U.S. Cl. .................. 428/332; 427/385.5; 427/387; 427/393.5; 427/412.4; 428/343; 428/352; 428/355; 428/422; 428/447; 428/480; 428/900
[58] Field of Search ............. 428/343, 352, 421, 422, 428/341, 355, 213, 900, 332, 447, 480; 427/387, 385.5, 412.4, 393.5; 560/115, 150; 528/70; 156/330

[56] References Cited

U.S. PATENT DOCUMENTS

| | | | |
|---|---|---|---|
| 3,318,852 | 5/1967 | Dixon | 428/341 |
| 3,536,749 | 10/1970 | Groves | 560/150 |
| 3,778,308 | 12/1973 | Roller et al. | 428/421 |
| 3,810,874 | 5/1974 | Mitsch et al. | 528/70 |
| 4,057,596 | 11/1977 | Takamizawa et al. | 427/387 |
| 4,216,252 | 8/1980 | Moeller | 427/387 |
| 4,219,377 | 8/1980 | Abrecht | 156/330 |
| 4,321,404 | 3/1982 | Williams et al. | 560/115 |
| 4,404,247 | 9/1983 | Dominquez-Burguette et al. | 428/213 |
| 4,419,404 | 12/1983 | Arai et al. | 428/422 X |

Primary Examiner—Thomas J. Herbert
Attorney, Agent, or Firm—Cruzan Alexander; Donald M. Sell; William G. Ewert

[57] ABSTRACT

Low surface energy liner provided by segments of a perfluoropolyether monomer which has been in-situ polymerized into a cohesive network which is adhered to a substrate. The low surface energy liner is especially useful as a low-adhesion backsize coating for a pressure-sensitive adhesive tape.

20 Claims, No Drawings

4,472,480

LOW SURFACE ENERGY LINER OF PERFLUOROPOLYETHER

TECHNICAL FIELD

This invention concerns low surface energy liners having protective, release, or lubricating function, e.g., low-adhesion backsize coatings that permit pressure-sensitive adhesive tapes to be wound upon themselves for storage and later unwound to be put to use.

BACKGROUND ART

Pressure-sensitive adhesive tape which is wound upon itself in roll form has a low-adhesion backsize coating to permit the tape to be unwound without delaminating. If the tape is not wound upon itself, its adhesive is customarily protected by a disposable web which likewise has a low-adhesion coating. Any such low-adhesion coating must both adhere strongly to its underlying substrate and be sufficiently cohesive not to contaminate the adhesive, i.e., not to interfere unduly with its adhesiveness. Low-adhesion backsize coatings are disclosed in U.S. Pat. Nos. 3,318,852; 3,536,749; 4,057,596 and 4,216,252.

Certain pressure-sensitive adhesives are so aggressively tacky that tapes require undesirably high peel forces to be removed from known low-adhesion backsize coatings, especially after prolonged storage. Such tapes may carry away and thus be contaminated by appreciable amounts of the low-adhesion material. It is believed that no release coating of the prior art is fully effective for use with aggressively tacky poly(dimethylsiloxane) pressure-sensitive adhesives.

The need for improved low-adhesion coatings is especially acute for pressure-sensitive adhesive tapes having porous backings such as breathable medical tapes. When such tapes are wound upon themselves into roll form, the pressure-sensitive adhesive may gradually flow into the pores of the backing and thus create a mechanical bond that may cause the adhesive layer to split upon unwinding unless the low-adhesion backsize coating is exceedingly effective. For some such tapes it has been necessary to employ a nonporous, disposable, low-adhesion web, the cost of which could have been avoided if a better low-adhesion backsize coating were available.

Pressure-sensitive adhesive transfer tapes which are marketed in roll form usually have a carrier web having low-adhesion coatings on both surfaces, one of which provides a lower unwinding force so that the adhesive layer remains on the carrier web during unwinding. If the pressure-sensitive adhesive is highly aggressive, the low-adhesion coating which is to provide the higher unwinding force must accomplish the aforementioned objectives, and the low-adhesion coating which is to provide the lower unwinding force must be even more effective.

Coatings comparable to low-adhesion backsize coatings have other uses, e.g., nonstick coatings for cooking utensils, ice-releasing coatings for aircraft, and lubricative coatings for magnetic recording media. Such low-adhesion coatings are sometimes called "release coatings", a term which also encompasses release agents for molds, which may be effective only by falling cohesively. Lubricants usually function by cohesive failure. To distinguish release coatings which are designed to fail cohesively from those which are designed to resist cohesive failure, the latter are here called "liners[ and, more specifically, "low surface energy liners" because low surface energy is important to their effectiveness.

DISCLOSURE OF INVENTION

The present invention provides a low surface energy liner which is effective as a low-adhesion coating for use with the most aggressive pressure-sensitive adhesives without unduly diminishing their adhesiveness.

Briefly, the present invention concerns a substrate having a liner comprising an insoluble polymer of polymerized, film-forming monomer having a polymerizable functionality greater than 1 and a perfluoropolyether segment which is a plurality of perfluoroalkylene oxide, —$C_aF_{2a}O$—, repeating units, where subscript a in each such unit is independently an integer from 1 to 4, which segment preferably has a number average molecular weight of 500 to 20,000. The monomer can be in-situ polymerized, i.e., polymerized in place on the substrate. The in-situ polymerized liner resists transfer when used as a low-adhesion coating for an aggressively pressure-sensitive adhesive tape. Even though the thickness of the polymer liner may be ultra-thin or so thin as to be virtually monomolecular, it provides a barrier or liner which effectively prevents the most aggressive pressure-sensitive adhesives from becoming appreciably bound to the underlying substrates, even after prolonged storage. While being exceedingly difficult to measure, preferred thicknesses of the low surface energy liner of the invention are in the approximate range of 5 to 500 nm (nanometers), more preferably within 10 to 100 nm. Although perfluoropolyether monomers are exceedingly expensive, so little material is used in making such thin coatings that the low surface energy liners would be costwise competitive with comparable liners of the prior art.

The low surface energy liner of the invention may be applied to a substrate by the steps of
(a) providing a dilute solution of a polymerizable monomer having an average polymerization functionality greater than 1 and comprising a perfluoropolyether segment which
  comprises —$C_aF_{2a}O$— repeating units, where subscript a in each such unit is independently an integer from 1 to 4, and
  preferably has a number average molecular weight of 500 to 20,000,
(b) coating said solution onto the substrate,
(c) drying the coating (to remove solvent), and
(d) in-situ polymerizing the monomer.

The resulting polymer liner comprises a cohesive network of perfluoropolyether segments, adhered to the substrate, said polymer preferably being an addition polymer.

When the perfluoropolyether monomer has polymerizable functional groups having ethylenic unsaturation such as acryloyl, polymerization can be effected by exposing the coated substrate to ultraviolet radiation, preferably in an inert atmosphere. Usually the whole process can be carried out in-line, but some difficulty has been encountered in obtaining a sufficiently inert atmosphere for dried coatings greater than 200 nm in thickness.

When the perfluoropolyether monomer has hydrolyzable silane, epoxy, or isocyanate polymerizable groups, thermal polymerization can be employed by exposing the coated substrate to thermal radiation. When the polymerizable groups are epoxy, ultraviolet radiation may be employed in air in the presence of an aromatic onium salt polymerization catalyst, such as diphenyliodonium hexafluoroantimonate or triphenylsulfonium hexafluoroantimonate, incorporated into the coating solution.

In any event, the polymer making up the liner is insoluble (that is, crosslinked), as manifested by its insolubility in "Freon" 113 (1,1,2-trichloro-2,2,1-trifluoroethane) at 20° C.

The thickness of the low energy liner is conveniently controlled by the proportion of solvent in the solution from which the perfluoropolyether monomer is coated. Coating techniques useful for in-line processing include brushing, wire or knife coating, spraying, curtain coating and gravure coating. While the thickness of the low energy liner is preferably less than 500 nm because of the high cost of perfluoropolyether monomer, much greater thicknesses are equally useful, and it may be as thin as 5 or 10 nm. The particular thickness used will also depend on the particular application or utility of the liner.

The perfluoropolyether segments in the polymer form a cohesive network which apparently becomes bonded to the contiguous substrate at a large number of points, and even though the bonds may be individually quite weak, together they adequately adhere the network to the substrate.

Suitable substrates to which the coating can be applied include, for example, paper, glass, steel, aluminum, plastics such as polyester, polyvinyl chloride, non-woven fabrics and the like. For those applications in which the release coated article is to be a pressure-sensitive tape or sheet, it is desirable that the substrate be flexible.

The low surface energy liners of the invention are useful in a variety of other applications such as nonstick coatings for cooking utensils, ice-releasing coatings for aircraft, and lubricative coatings for magnetic recording media.

If the low surface energy liner does not adhere well to the substrate, it may be desirable to apply first a primer or an adhesion-promoting coating, as is well-known in the art.

Suitable perfluoropolyether monomers for making the low surface energy liner of the invention have the formula $$Q\text{---}(C_aF_{2a}O)_k C_aF_{2a}\text{---}Z \tag{A}$$

wherein Q comprises a polymerizable (preferably addition polymerizable) group attached to a chain of randomly distributed perfluoroalkylene oxide, —$C_aF_{2a}O$—, repeating units, in each of which a is independently an integer of 1 to 4, k is the number of such repeating units and it has a value from 1 to 300 such that the segment preferably has a number average molecular weight of 500 to 20,000, and Z is —$OC_aF_{2a+1}$ or Q. If Z is not Q, it preferably is —$OCF_3$, —$OCF_2CF_3$, or —$OCF(CF_3)CF_3$. Typically the perfluoroalkylene oxide units will be —$CF_2O$—, —$C_2F_4O$—, and/or —$C_3F_6O$—.

It is preferred that the perfluoropolyether monomers have functionalities within the range of 1.5 to 2.0 in order to provide covalent bonding at both ends of most of the segments.

Preferred perfluoropolyether monomers are the ethylenically-unsaturated monomers disclosed in U.S. Pat. No. 3,810,874 (Mitsch et al.) and U.S. Pat. No. 4,321,404 (Williams et al.) wherein Q of the above Formula A is selected from

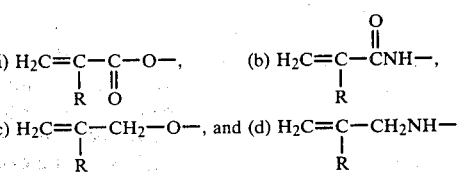

where R is hydrogen or methyl.

These preferred ethylenically-unsaturated perfluoropolyether monomers which have the formula $$Q\text{---}CF_2O(CF_2CF_2O)_m(CF_2O)_nCF_2\text{---}Q \tag{B}$$

wherein Q is as defined above and m and n designate the number of randomly distributed perfluoroethyleneoxy and perfluoromethylene oxy backbone repeating units, respectively, n and m having independently values, for example, from 1 to 200 and the ratio m/n is 0.2/1 to 5/1.

Examples of polymerizable perfluoropolyether monomers of Formula A useful for making the low-energy liner of the invention are those of the following where here again, as elsewhere, the perfluoroalkylene oxide units are randomly distributed, the given numbers of which are average values.

Perfluoropolyether Monomer

I. $H_2C=CH-CO-CH_2CH_2NHC(O)-CFO(CF_2CFO)_3CF_2CF_2(OCF_2CF_2)_8OCF-C(O)NH-CH_2CH-OC(O)-CH=CH_2$ with $CF_3$ groups and $CF_3$

II. $H_2C=CH-CO-CH_2CF_2O(CF_2CF_2O)_8(CF_2O)_{14}CF_2CH_2-OC(O)-CH=CH_2$

III. $H_2C=C(CH_3)-CO-CH_2CF_2O(CF_2CF_2O)_{16}(CF_2O)_{28}CF_2CH_2-OC(O)-C(CH_3)=CH_2$

IV. $H_2C=CHCH_2OCH_2CF_2O(CF_2CF_2O)_{16}(CF_2O)_{28}CF_2CH_2OCH_2CH=CH_2$

V. $H_2C=C(CH_3)-CO(-CH_2)_{\overline{7}}NHCO-CH_2CF_2O(CF_2CF_2O)_{14}CF_2CH_2-OCNH(CH_2)_2OC(O)-C(CH_3)=CH_2$ VI. $H_2C=CH-C(O)NH-\langle C_6H_3(CH_3)\rangle-NHCO(CH_2)_2OC(O)-CF_2O(C_3F_6O)_4(CF_2O)_3CF_2-C(O)O(CH_2)_2OCNH-\langle C_6H_3(CH_3)\rangle-NHC(O)-CH=CH_2$ VII. $H_2C=CHCH_2-OCNH-\langle\text{cyclohexyl}(CH_3)_2,S,(CH_3)_2\rangle-NHCO(CH_2)_2NHC-CF_2O(CF_2CF_2O)_8(CF_2O)_{14}CF_2-CNH(CH_2)_2OCNH-\langle\text{cyclohexyl}(CH_3)_2,S,(CH_3)_2\rangle-NHCO-CH_2CH=CH_2$ VIII. $H_2C=CHCO(CH_2)_2NHC-CF_2O(CF_2CF_2O)_8(CF_2O)_{14}CF_2-CNH(CH_2)_2OCCH=CH_2$ IX. $H_2C=CH-CNH-C(CH_3)_2CNH_2CF_2O(CF_2CF_2O)_{14}CF_2-NHC-C(CH_3)_2-NHC-CH=CH_2$

X. $H_2C=CHCH_2NHC-CF_2O(CF_2CF_2O)_{14}CF_2CNH-CH_2CH=CH_2$

XI. $H_2C\overset{O}{\underset{}{\triangle}}CHCH_2OCH_2-CF_2O(CF_2CF_2O)_8(CF_2O)_{14}CF_2-CH_2OCH_2CH\overset{O}{\underset{}{\triangle}}CH_2$ -continued
Perfluoropolyether Monomer
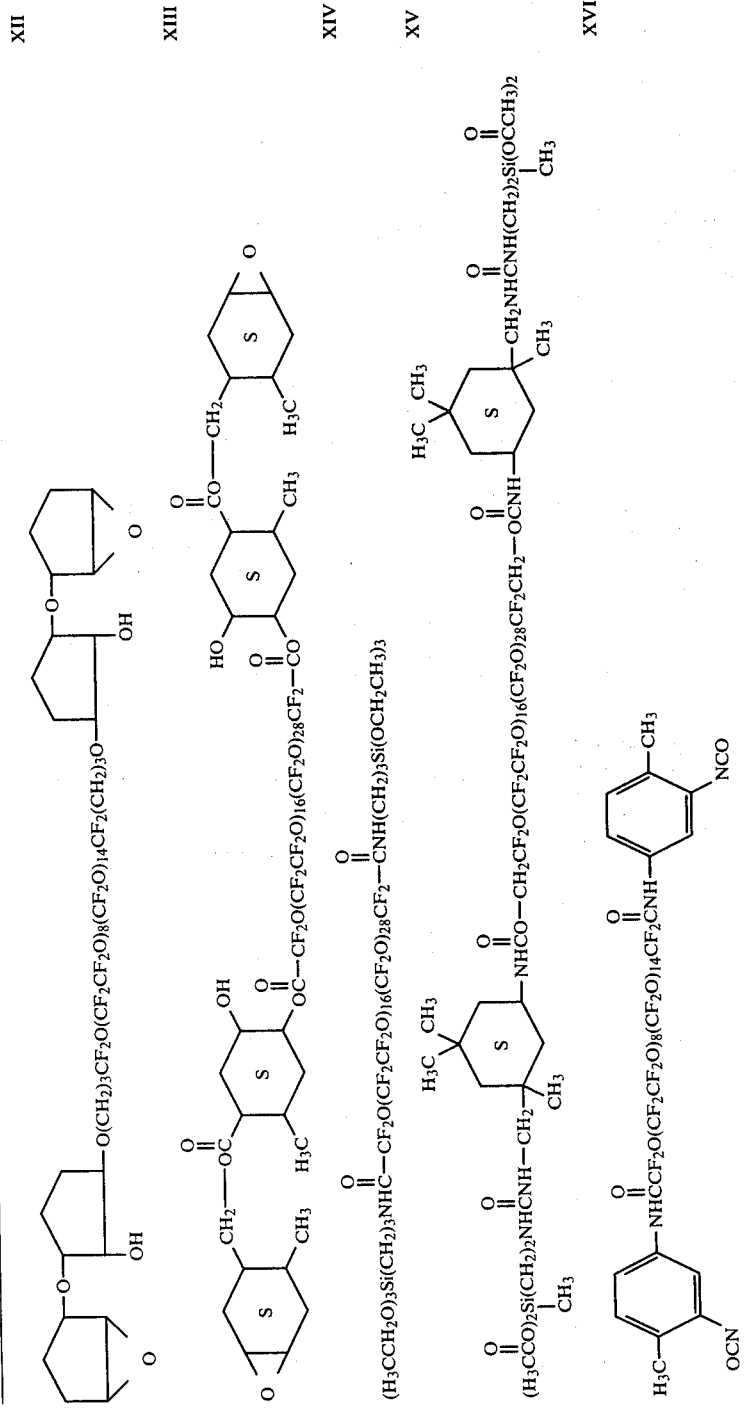

Further description of such monomers, and their preparation, will be omitted in the interest of brevity, the disclosure of said U.S. Pat. Nos. 3,810,874 and 4,321,404 being incorporated herein for such purposes.

In making a low surface energy liner of the invention, one or more other types of monomers copolymerizable with the perfluoropolyether monomer may be dissolved into the solution in amounts providing up to about 20% by weight of the low-energy liner. However, the liner is most effective if the amount of the perfluoropolyether monomer is such that at least 75% of the liner's weight is provided by perfluoropolyether segments. When the perfluoropolyether monomer has polymerizable groups which are ethylenically unsaturated, useful copolymerizable monomers include acrylic and methacrylic esters, amides, and urethanes, and vinyl ethers, epoxides, and heterocycles.

When Q of Formulae A or B is a 1,2-epoxy group, useful copolymerizable monomers include 1,2-epoxy-substituted esters, ethers, siloxanes, and nitriles such as listed in columns 3 and 4 of U.S. Pat. No. 4,219,377.

When Q of Formulae A or B is a hydrolyzable silane group, useful copolymerizable monomers include silanes which may be linear or cyclic and may have alkoxy, halo, cyano, aceto, methacryloxy, lower alkenyl, or phenyl substituents.

When Q of Formulae A or B is an isocyanato group, useful copolymerizable monomers include isocyanates, polyols, and polyamines.

EXAMPLES

The invention will be illustrated by the following examples. In these examples the tests for "Release Peel Force", "Readhesion Peel Force" and "Control Peel Force" were made using a roll of pressure-sensitive adhesive tape having an agressive poly(dimethylsiloxane) pressure-sensitive adhesive (Dow Corning DC 284), 0.025 mm in thickness. Its backing was biaxially-oriented poly(ethyleneterephthalate) film 0.038 mm in thickness and having no low-adhesion backsize coating.

In determining Release Peel Force, the pressure-sensitive adhesive layer of a piece of the test tape was pressed against the low surface energy liner using a smooth plastic bar. After simulated aging at an elevated temperature and cooling to 22° C., the underlying film was pressed against a layer of pressure-sensitive adhesive carried by a rigid plate, thus rigidifying the low surface energy liner. The test tape was then peeled back at an angle of 180° and at 2.3 m/min., and the peelback force (the "Release Peel Force") was measured after the peeling had begun.

After being peeled off, the pressure-sensitive adhesive tape was adhered to a clean glass plate using two passes of a 2-kg hand rubber roller, and the 180° peelback force (the "Readhesion Peel Force") was again measured at at 2.3 m/min.

Another piece of the test tape was adhered to a clean glass plate and tested in the same way as in the previous test to provide the "Control Peel Force". Any appreciable reduction in Readhesion Peel Force versus Control Peel Force was presumed to result from appreciable transfer of low-energy liner material to the pressure-sensitive adhesive.

The following examples employ the perfluoropolyether monomers listed above, some of which were first modified as indicated below:

| Perfluoro-polyether | |
|---|---|
| XVII | Perfluoropolyether II (80 parts) plus 20 parts of methacrylic acid |
| XVIII | Perfluoropolyether III (80 parts) plus 20 parts of 2-hydroxyethyl methacrylate |

In the examples, all parts are by weight.

EXAMPLE 1

A 1% solution of Perfluoropolyether Monomer II in 1,1,2-trichloro-1,2,2-trifluoroethane ("Freon" 113) was coated onto biaxially-oriented poly(ethyleneterephthalate) film using a wire-wound rod and allowed to dry under ambient conditions to provide a low-energy liner. Its calculated thickness was about 70 nm. While under a nitrogen atmosphere and at a speed as indicated in Table A below, the coated film was irradiated with ultraviolet light from a pair of medium-pressure mercury lamps at 80 watts per cm using an ultraviolet processor from PPG Industries, Model QC 1202AN3IR. This polymerized the perfluoropolyether in situ to provide a low-energy liner which was tested after simulated aging at 70° C. for 24 hours using a poly(dimethylsiloxane) pressure-sensitive adhesive tape made from Dow Corning DC 284 having an adhesive thickness of 0.025 mm. Results were

| Release Peel force | <0.2 N/dm |
|---|---|
| Readhesion Peel Force | 40–45 N/dm |
| Control Peel Force | 40–43 N/dm |

EXAMPLE 2

A number of low surface energy liners of the invention were made in the same way as in Example 1 except as indicated in Table A which also reports test values.

TABLE A

| Example | Perfluoro-polyether | Low-energy liner thickness (nm) | Speed (m/min) | Peel Forces (N/dm) | | |
|---|---|---|---|---|---|---|
| | | | | Release | Readh.*** | Control |
| 1 | II | 70 | 25 | <0.2 | 40–45 | 40–43 |
| 2 | II | 14 | 18 | 1.0–1.4 | 49 | 40–43 |
| 3 | V | 34 | 25** | 2.0–3.0 | 40–50 | 39–42 |
| 4 | XVII | 70 | 25 | 2.0–3.0 | 36–38 | 39–42 |
| 5 | XVIII | 70 | 25 | 2.0–3.0 | 35–37 | 39–42 |
| 6 | IV* | 70 | 25 | 2.0–4.0 | 29–45 | 39–42 |
| 7 | X* | 70 | 25 | 2.0–6.0 | 34–45 | 39–42 |

*Solution also contained 5 parts of 2,4-bis(trichloromethyl)-6-(4-methoxyphenyl)-s-triazine per 95 parts of the perfluoropolyether monomer.
**Two passes
***"Readh." means readhesion.

EXAMPLE 8

A 1% solution in "Freon" 113 containing 99 parts of Perfluoropolyether Monomer II and 1 part of benzildimethylketal was coated onto 0.1 mm biaxially-oriented poly(ethyleneterephthalate) film using a wire-wound rod and allowed to dry under ambient conditions to give a calculated dry thickness of about 70 nm. The coated film was placed inside a container equipped with nitrogen inlet and outlet at a distance of 7.6 cm below a 5 mm Pyrex glass plate cover. A 275 watt sunlamp from General Electric (order code RS) was positioned 18 cm above the glass plate. The container was flushed with nitrogen for 15 min. and the lamp allowed to warm up before removing a shutter to expose the coating. The coating was irradiated for the length of time indicated in Table B. This polymerized the perfluoropolyether in situ to provide a low surface energy liner which was tested after simulated aging using the Test Tape. Results were:

| Release Peel Force | 0.8–2 N/dm |
| --- | --- |
| Readhesion Peel Force | 48 N/dm |
| Control Peel Force | 40–43 N/dm |

EXAMPLES 9–11

A number of low surface energy liners of the invention were made in the same way as in Example 8 except that the poly(ethyleneterephthalate) film had on it a primer coating of poly(vinylidenedichloride). Test results are reported in Table B.

TABLE B

| Ex. | Perfluoropolyether | Low Surface energy liner Thickness (nm) | Irradiation Time (min) | Peel Forces (N/dm) | | |
| --- | --- | --- | --- | --- | --- | --- |
| | | | | Release | Read. | Control |
| 8 | II | 68 | 2 | 0.8–2.0 | 48 | 40–43 |
| 9 | II | 1700 | 2 | 1.1 | 54 | 55 |
| 10 | III | 1700 | 25 | 0.6 | 49–54 | 49–54 |
| 11 | VIII | 1700 | 5 | 4.4 | 54 | 49–54 |

EXAMPLE 12

A 25% solutes solution in "Freon" 113 containing 99 parts Perfluoropolyether Monomer II and 1 part benzildimethylketal was coated onto 0.1 mm biaxially-oriented poly(ethyleneterephthalate) film using a wire-wound rod and allowed to dry under ambient conditions to give a calculated thickness of 1.7 micrometers. The coating was irradiated for 10 min. under nitrogen using a sunlamp as described in Example 8 to provide a low surface energy liner. A solution containing 100 parts DC 284 poly(dimethylsiloxane), 75 parts toluene, 25 parts heptane and 1.2 parts of a 50/50 mixture of 2,4-dichlorobenzoyl peroxide/dibutyl phthalate was coated onto the low-energy liner using a knife coater. After allowing most of the solvent to evaporate under ambient conditions, the composite was placed in a 138° C. oven for 5 min. to provide a silicone pressure-sensitive adhesive cured in situ on the low surface energy liner. The dry thickness of the adhesive was 0.1 mm. A 0.038 mm film of poly(ethyleneterephthalate) was then laminated to the adhesive, thus creating a pressure-sensitive adhesive tape adhered to the low surface energy liner. After simulated aging at 70° C. for 20 hours and cooling to 22° C., the tape was peeled back with the following results:

| Release Peel Force | 16–19 N/dm |
| --- | --- |
| Readhesion Peel Force | 12–24 N/dm |
| Control Peel Force | 56 N/dm |

EXAMPLE 13

The procedure of Example 12 was repeated except that the 25% solutes coating solution contained 94 parts of the Perfluoropolyether Monomer II, 5 parts of an inert perfluoropolyether (Braycote 815Z), and 1 part of benzildimethylketal. After simulated aging at 70° C. for 20 hours and cooling to 22° C., the tape was peeled back with the following results:

| Release Peel Force | 3.4–5.6 N/dm |
| --- | --- |
| Readhesion Peel Force | 29–46 N/dm |
| Control Peel Force | 56 N/dm |

EXAMPLE 14

A 0.5% solutes solution in 80/20 "Freon" 113/acetone containing 99 parts of Perfluoropolyether Monomer XI and 1 part of triphenylsulfonium hexafluoroantimonate was coated onto 0.1 mm biaxially-oriented poly(ethyleneterephthalate) film using a wire-wound rod and allowed to dry under ambient conditions to give a calculated thickness of 34 nm. The coating was irradiated in an air atmosphere using the ultraviolet processor described in Example 1 using two lamps at 80 watts/cm each and a speed of 25 m/min. The low surface energy coating was tested using the Test Tape after being in contact with the low surface energy liner for 4 hours under ambient conditions. Results were:

| Release Peel Force | 0.8–1.6 N/dm |
| --- | --- |
| Readhesion Peel Force | 36–42 N/dm |
| Control Peel Force | 39–42 N/dm |

EXAMPLE 15

6.8 g of a 8.3% solutes solution in "Freon" 113 containing 99 parts of the solutes of Perfluoropolyether Monomer XVI and 1 part 1-methylimidazole was poured into a 14.5 cm diameter petri dish. The solvent was allowed to evaporate under ambient conditions, and the residue allowed to stand under ambient conditions (50–65% relative humidity, 22° C.) for three days, thus providing a low surface energy liner having a thickness of about 12 micrometers. The low surface energy coating was tested using the Test Tape after being in contact for 24 hours at 68° C. Results were:

| Release Peel Force | 1.3–2.6 N/dm |
| --- | --- |
| Readhesion Peel Force | 30–36 N/dm |
| Control Peel Force | 39–42 N/dm |

EXAMPLE 16

To one gram of Perfluoropolyether XIV was added 0.2 g of tetraethylorthosilicate and 0.2 g of a 10% solution of dibutyltindiacetate in methyl ethyl ketone. This solution was coated onto biaxially-oriented poly(e- thyleneterephthalate) film of 0.038 mm thickness using a wire-wound rod. The coated film was placed in a 90° C. oven for 3 min. to dry the coating and to polymerize it in situ to provide a low surface energy liner about 2500 nm in thickness.

This low-energy liner was tested as described in Example 12, with the following results:

| Release Peel Force | 0.2 N/dm |
|---|---|
| Readhesion Peel Force | 55 N/dm |
| Control Peel Force | 65 N/dm |

I claim:

1. A substrate having an adherent, cohesive liner of low surface energy, 5 to 500 nanometers in thickness, prepared from monomer polymerized in situ on said substrate in the form of a coating, and comprising an insoluble addition polymer which comprises a plurality of perfluoropolyether segments of the formula $$-CF_2O(CF_2CF_2O)_m(CF_2O)_nCF_2-$$

where m and n denote randomly distributed repeating units and the ratio m/n is 0.2/1 to 5/1, each said segment having a number average molecular weight of 800 to 10,000, said segments being at least 75 percent of the weight of said liner.

2. A pressure-sensitive adhesive tape comprising a flexible web having a pressure-sensitive adhesive layer adherently bonded to one side thereof, and as a low adhesion backsize a liner of low surface energy comprising insoluble polymer of monomer polymerized in situ on the other side of said web in the form of a coating adherently bonded thereto, said polymer comprising perfluoropolyether segments which are a plurality of $-C_aF_{2a}O-$ repeating units, where in each such unit the subscript a is an integer of 1 to 4, said segments being at least 75 percent of the weight of said liner.

3. A substrate having a low surface energy liner in the form of a coating on said substrate and comprising a crosslinked polymer insoluble in 1,1,2-trichloro-2,2,1-trifluoroethane at 20° C., said polymer comprising perfluoropolyether segments which are a plurality of $-C_aF_{2a}O-$ repeating units, where in each such units subscript a is an integer from 1 to 4, at least 75 percent of the liner's weight being provided by said perfluoropolyether segments.

4. A substrate as defined in claim 3 wherein each said perfluoropolyether segment is $$-CF_2O(CF_2CF_2O)_m(CF_2O)_nCF_2-$$

wherein m and n denote randomly distributed repeating units and the ratio m/n is 0.2/1 to 5/1.

5. A substrate as defined in claim 3 wherein each said segment has a number average molecular weight of 500 to 20,000 and is derived from monomer having said segment, said polymer being an addition polymer formed by polymerizing said monomer in-situ on said substrate.

6. The article of claim 1 wherein said substrate is magnetic recording medium.

7. A flexible, plastic substrate having a low surface energy liner in the form of a coating on said substrate and a layer of aggressive poly(dimethylsiloxane) pressure-sensitive adhesive in contact with said liner, said liner comprising an insoluble polymer comprising perfluoropolyether segments which are a plurality of $-C_aF_{2a}O-$ repeating units, where in each such units subscript a is an integer from 1 to 4, at least 75 percent of the weight of said liner being provided by said perfluoropolyether segments.

8. The article of claim 7 wherein said substrate is a poly(ethyleneterephthalate) film.

9. A substrate having a liner of low surface energy and a layer of aggressive poly(dimethylsiloxane) pressure-sensitive adhesive coated onto said liner, said liner comprising insoluble polymer of monomer polymerized in-situ on one side of said substrate in the form of a coating adherently bonded thereto, said polymer comprising perfluoropolyether segments which are a plurality of $-C_aF_{2a}O-$ repeating units, where in each such unit the subscript a is an integer of 1 to 4, at least 75 percent of the weight of said liner being provided by said perfluoropolyether segments.

10. A substrate as defined in claim 9 wherein said perfluoropolyether segment is $$-CF_2O(CF_2CF_2O)_m(CF_2O)_nCF_2-$$

wherein m and n denote randomly distributed repeating units and the ratio m/n is 0.2/1 to 5/1.

11. Method of making a substrate with a liner, comprising the steps of
   (a) providing a dilute solution of a polymerizable monomer having a polymerizable functionality greater than 1 and comprising perfluoropolyether segments which are a plurality of $-C_aF_{2a}O-$ repeating units, where in each of such units subscript a is independently an integer from 1 to 4,
   (b) coating said solution onto the substrate,
   (c) drying the coating, and
   (d) polymerizing the monomer in-situ to provide a low surface energy liner in the form of a coating comprising an insoluble polymer having a cohesive network adhered to the substrate, the amount of said monomer in said solution being such that at least 75 percent of said liner's weight is provided by said perfluoropolyether segments.

12. Method as defined in claim 11 wherein said monomer has the formula $$Q-(C_aF_{2a}O)_kC_aF_{2a}-Z$$

wherein Q comprises a polymerizable group attached to a chain of k randomly distributed $-C_aF_{2a}O-$ repeating units, in each of which subscript a is independently an integer of 1 to 4, and Z is $-OC_aF_{2a+1}$ or Q.

13. Method as defined in claim 11 wherein said monomer has a functionality within the range of 1.5 to 2.0.

14. Method as defined in claim 13 wherein said functionality of said monomer is ethylenic unsaturation, and the polymerizing step (d) involves exposing the dried coating to ultraviolet radiation.

15. Method as defined in claim 13 wherein said perfluoropolyether segment is $$-CF_2O(CF_2CF_2O)_m(CF_2O)_nCF_2-$$

wherein m and n denote randomly distributed repeating units, the ratio m/n is 0.2/1 to 5/1, and wherein said monomer has a plurality of acryloyl groups.

16. Method as defined in claim 15 wherein said substrate is a flexible plastic film.

17. Method as defined in claim 15 wherein said substrate is a flexible plastic film.

18. Method as defined in claim 15 wherein said substrate is poly(ethyleneterephthalate) film.

19. Method as defined in claim 15 further comprising coating onto said liner of insoluble polymer a solution of poly(dimethylsiloxane) and heating the resulting coating to provide a silicone pressure-sensitive adhesive on said liner.

20. Method as defined in claim 15 wherein said substrate is magnetic recording medium.

* * * * *

UNITED STATES PATENT AND TRADEMARK OFFICE
CERTIFICATE OF CORRECTION

PATENT NO. : 4,472,480

DATED : September 18, 1984

INVENTOR(S) : Paul E. Olson

It is certified that error appears in the above-identified patent and that said Letters Patent is hereby corrected as shown below:

Col. 1, line 64, "falling" should read -- failing -- .

Col. 1, line 68, ""liners[ and" should read -- "liners" and -- .

Col. 2, line 27, "bound" should read -- bonded -- .

Col. 14, lines 67 and 68 should be omitted.

"20 Claims, No Drawings" should read -- 19 Claims, no Drawings --.

Signed and Sealed this

Ninth Day of April 1985

[SEAL]

Attest:

DONALD J. QUIGG

Attesting Officer

Acting Commissioner of Patents and Trademarks